United States Patent
Wunderlich et al.

(10) Patent No.: US 11,247,628 B2
(45) Date of Patent: Feb. 15, 2022

(54) FASTENING AN AIRBAG IN THE VEHICLE

(71) Applicant: Audi AG, Ingolstadt (DE)

(72) Inventors: Matthias Wunderlich, Ingolstadt (DE); Christof Oles, Lenting (DE)

(73) Assignee: Audi AG, Ingolstadt (DE)

( * ) Notice: Subject to any disclaimer, the term of this patent is extended or adjusted under 35 U.S.C. 154(b) by 61 days.

(21) Appl. No.: 16/604,899

(22) PCT Filed: May 7, 2018

(86) PCT No.: PCT/EP2018/061685
§ 371 (c)(1),
(2) Date: Oct. 11, 2019

(87) PCT Pub. No.: WO2018/210601
PCT Pub. Date: Nov. 22, 2018

(65) Prior Publication Data
US 2020/0101922 A1    Apr. 2, 2020

(30) Foreign Application Priority Data

May 16, 2017   (DE) ...................... 10 2017 208 230.5

(51) Int. Cl.
*B60R 21/205*      (2011.01)
*B23K 20/12*       (2006.01)

(52) U.S. Cl.
CPC ............ *B60R 21/205* (2013.01); *B23K 20/12* (2013.01)

(58) Field of Classification Search
CPC .................................................. B60R 21/205
See application file for complete search history.

(56) References Cited

U.S. PATENT DOCUMENTS 6,568,705 B2 *   5/2003   Kinane ................. B60R 21/205
                                                      280/728.3
6,857,654 B2 *   2/2005   Choi .................... B60R 21/2165
                                                      280/728.2

(Continued)

FOREIGN PATENT DOCUMENTS

CN      101102921 A      1/2008
CN      101161510 A      4/2008

(Continued)

OTHER PUBLICATIONS

International Search Report and Written Opinion of the International Searching Authority directed to related International Patent Application No. PCT/EP2018/061685, dated Jul. 18, 2018, with attached English-language translation; 13 pages.

(Continued)

*Primary Examiner* — Faye M Fleming
(74) *Attorney, Agent, or Firm* — Sterne, Kessler, Goldstein & Fox P.L.L.C.

(57) ABSTRACT

A fastening device fastens an airbag module to an airbag receiver on an instrument panel of a vehicle by forming at least one mechanical connection and at least one welded connection between the airbag module and the instrument panel. The instrument panel has at least one projection and a flange protruding from the projection to define a compartment and form a fastening bracket for the mechanical connection of the airbag module to the instrument panel. The instrument panel and the airbag receiver have welding ribs for the welded connection between the airbag receiver of the airbag module and the instrument panel. A device prepares an instrument panel and a corresponding instrument panel. A method includes steps of fastening an airbag to the instrument panel and a vehicle with a corresponding instrument panel.

14 Claims, 4 Drawing Sheets

(56) References Cited

U.S. PATENT DOCUMENTS

| | | | |
|---|---|---|---|
| 7,568,724 B2 * | 8/2009 | Kutchey | B60R 21/205 |
| | | | 280/728.3 |
| 7,862,070 B2 | 1/2011 | Steinke | |
| 8,424,905 B2 | 4/2013 | Brunet | |
| 9,061,643 B1 | 6/2015 | Raines et al. | |
| 9,358,944 B1 | 6/2016 | Aselage et al. | |
| 2003/0047915 A1 | 3/2003 | Sun et al. | |
| 2003/0080540 A1 | 5/2003 | Kinane | |
| 2007/0262569 A1 | 11/2007 | Kikuchi et al. | |
| 2010/0078920 A1 | 4/2010 | Terai et al. | |
| 2012/0153604 A1 | 6/2012 | Hamels et al. | |
| 2012/0267878 A1 | 10/2012 | Kalisz et al. | |
| 2016/0221295 A1 | 8/2016 | Roychoudhury | |

FOREIGN PATENT DOCUMENTS

| | | |
|---|---|---|
| CN | 102216124 A | 10/2011 |
| CN | 102700495 A | 10/2012 |
| CN | 105398414 A | 3/2016 |
| DE | 10241598 A1 | 5/2003 |
| DE | 102007021533 A1 | 12/2007 |
| DE | 102009034124 A1 | 3/2011 |
| DE | 102009040246 A1 | 4/2011 |
| DE | 102012206210 A1 | 10/2012 |
| DE | 10206101125 A1 | 8/2016 |
| DE | 102016101207 A1 | 8/2016 |
| DE | 102015104760 A1 | 9/2016 |
| EP | 2080675 B1 | 7/2009 |
| FR | 2970921 A1 | 8/2012 |

OTHER PUBLICATIONS

International Preliminary Report on Patentability directed to related International Patent Application No. PCT/EP2018/061685, dated Nov. 19, 2019, with attached English-language translation; 13 pages.

* cited by examiner

FASTENING AN AIRBAG IN THE VEHICLE

TECHNICAL FIELD

The present invention relates to a fastening device for fastening an airbag in a vehicle. Furthermore, the invention relates to a device for the preparation of an instrument panel and a corresponding instrument panel. In addition, the invention relates to a method for fastening an airbag to the instrument panel and a vehicle with a corresponding instrument panel.

BACKGROUND

In modern vehicles, a variety of safety devices are commonly found nowadays.

Such a safety device is, for example, a passenger airbag. Passenger airbags are usually attached below a cover on an instrument panel. Thus, so that in the event of an emergency or an accident, the passenger airbag can fulfill its intended function and opens in the passenger compartment, there is a weakened area in the cover, e.g. a perforated structure.

For guiding the airbag or an air sac of the airbag, a guide device is provided. This is welded to the instrument panel together with an airbag module containing the actual airbag.

For a secure hold during an emergency or accident, usually also a mechanical connection of the guide device or the airbag module is provided on the instrument panel.

DE 102 41 598 A1 discloses a dashboard in which a plurality of welding webs is provided for vibration welding with an inner surface of a base member on a front surface of a funnel. An airbag module is fastened to the funnel via a number of projections integrally formed on the funnel with fastening elements. The funnel is thus connected only via a welded connection to the base member and the airbag module is connected only to the funnel.

DE 10 2012 206 210 A1 discloses an active pad in which a base wall has a wide rib which projects from a first surface continuously along a closed circumference. Another wall called "front wall" has a plurality of narrow ribs that project concentrically from a second surface continuously along the closed circumference. Each narrow rib should be welded to the wide rib.

EP 2 080 675 B1 discloses an airbag stowage device which is to be attached to an instrument panel. The device has a flap portion extending to face an upper plate portion and a plurality of connecting ribs raised from the flap portion. The flap portion is to be vibration-welded integrally to the upper plate member at ends of the plurality of connecting ribs.

US 2010/0078920 A1 discloses an airbag door having a welding surface to be connected to an inner surface of a dash panel by vibration welding, wherein a plurality of welding ribs in a vibration welding direction and a bridge rib are arranged transversely to the welding ribs on the welding surface.

A mechanical connection is not provided in the last-mentioned documents.

SUMMARY OF INVENTION

It is therefore an object of the present invention to address at least some of the disadvantages of the prior art. In particular, a device is to be provided which allows a secure fastening of an airbag in a vehicle. At least one alternative should be proposed to known solutions.

According to the embodiments of the invention, the object is achieved by a fastening device according to independent claim 1, by a device for preparing an instrument panel according to independent claim 9, by a corresponding instrument panel according to independent claim 11, and by a method according to independent claim 12 and a vehicle according to the independent claim 13. Further respective embodiments can be derived from the dependent patent claims and the description.

According to the embodiments of the invention, a fastening device for fastening an airbag module to an airbag receiving means on an instrument panel of a vehicle is proposed, wherein the fastening device is configured to realize a mechanical connection and a welded connection between the airbag module and the instrument panel, wherein the instrument panel has at least one projection and a flange protruding from the projection which delimit a compartment and form a fastening bracket for the mechanical connection of the airbag module to the instrument panel, and the instrument panel and the airbag receiving means have welding means for the welded connection between the airbag receiving means of the airbag module and the instrument panel.

The welded connection connects the airbag receiving means to the instrument panel. As a result, a cohesive connection between the instrument panel and the airbag receiving means of the airbag module is produced, which has the advantage of an already very stable and firm connection. In addition, a welded connection is low maintenance and wear because there are no other fasteners. As a result, the airbag receiving means or the airbag module is permanently connected to the instrument panel.

The fastening device according to an embodiment of the invention is further configured to additionally realize a mechanical connection with which the airbag module is fastened to the instrument panel. This further increases the strength and durability of the connection in the event of an accident. For this purpose, the airbag receiving means and the actual module carrying the airbag, referred to below as the airbag carrier, are connected to the instrument panel via at least one fastening bracket. The fastening bracket allows for precise positioning of the airbag holder. By the projection, which is formed on the instrument panel, the airbag receiving means is spaced from the instrument panel, so that the airbag receiving means can form a guide for the airbag or an air sac of the airbag.

The airbag receiving means and the airbag carrier are two separate, independent components. As a result, after an accident triggering the airbag, the airbag carrier can be replaced and connected via the mechanical connection with the airbag receiving means and the instrument panel and fastened thereto.

An embodiment of the fastening device is characterized in that the instrument panel has at least two respective fastening brackets formed thereon, each having at least one fastening bore, and the airbag receiving means, which is to be arranged between the instrument panel and the airbag carrier, has respective connecting bores, which correspond with the respective at least one fastening bore of the at least two fastening brackets, wherein the respective fastening bores and connecting bores are adapted to receive a respective fastener which cooperates with the fastening bores and connecting bores and is adapted to fasten the airbag support on the at least two fastening brackets and the airbag receiving means and connect it to the instrument panel. Several fastening brackets increase the connection effect of the respective components, namely instrument panel, airbag receiving means and airbag carrier. Due to the special design of the corresponding bores, the three components of the instrument panel, airbag holder and airbag receiving means can be connected to one another in a simple manner, whereby the airbag module is fastened to the instrument panel.

Another embodiment of the fastening device is characterized in that the fastening brackets are arranged opposite to an edge region of the fastening device and the respective compartments of the fastening brackets each have an opening which are arranged aligned with each other. The mutually facing openings ensure that the mechanical connection does not hinder the welded connection during welding. It is particularly advantageous, as will be described in more detail below, that the cores necessary for the preparation of the fastening brackets, also called slides, can be removed inward, so in an intermediate space between the fastening brackets. Thereby, the welding means can be circumferentially and continuously arranged or applied or formed around the fastening brackets, whereby a better welded connection is made possible.

A further embodiment of the fastening device is characterized in that the welding means comprise a plurality of respective welding ribs on the instrument panel and the airbag receiving means, which are welded together. The welding ribs allow, for example, the possibility of vibration welding. Alternatively, the instrument panel and the airbag receiving means can also be interconnected by infrared welding or ultrasonic welding. Thereby no further entry of another welding material takes place, whereby weight is saved. The welding ribs are formed both on the instrument panel and on the airbag receiving means.

A still further embodiment of the fastening device is characterized in that the respective welding ribs are arranged in each case continuously around the circumference of the fastening brackets. An all-round weld rib that is free of interruptions allows a homogeneous and uniform weld zone. The connection effect for connecting the airbag receiving means to the instrument panel is thus substantially the same throughout the entire welding zone.

Yet another embodiment of the fastening device is characterized in that in each case four welding ribs are formed on the instrument panel and the airbag receiving means, which run concentrically around the fastening brackets. Four welding ribs provide a particularly good welded connection that provides sufficient strength but does not take up too much space on the instrument panel.

The fastening device is further developed in that, furthermore, welding ribs are arranged in a space between the fastening brackets on the instrument panel and the airbag receiving means. As a result, a surface connection of the airbag receiving means is achieved with the instrument panel. A flat connection has a particularly good strength.

An embodiment of the fastening device provides that the respective fastening brackets each have at least one stiffening rib. As a result, the fastening brackets are stiffened, whereby the fastening brackets deform in the event of an accident less or substantially not at all, and the risk of breakage of the brackets is thus prevented. This ensures the safe function of the airbag.

An embodiment of the invention further provides a device for preparing at least a portion of an instrument panel comprising a mold comprising at least two cores for forming at least two fastening brackets and means for forming continuous welding means, wherein the at least two cores each have an opening side, so that after a casting process, the at least two cores are removable from the mold by moving them towards each other, whereby the at least two cores define a compartment in the at least two fastening brackets each having an opening so that the openings face each other. As a result, the cores can be removed inwards, so that circumferential, continuous welding means around the fastening brackets are made possible, as already described above. For example, the instrument panel including the two receiving means can be manufactured using a plastic injection molding process. It is irrelevant whether the instrument panel is produced as a plastic component of physically or chemically foamed material or of compact foam material. The cores necessary for forming the receiving means or fastening brackets cannot be removed from the main direction of demolding, but only laterally, for which tool slides are used. By forming the openings to each other, the tool slides can be moved inwards, i.e. towards each other, whereby the welding means can run circumferentially and continuously around the receiving means.

An embodiment of the device is characterized in that the at least two cores each have at least one respective recess which is adapted to form at least one stiffening rib in the compartment of the respective fastening bracket. The at least one stiffening rib to be formed thereby stiffens the fastening bracket, so that the fastening bracket does not deform in the event of an accident.

An embodiment of the invention further provides an instrument panel of a vehicle for receiving an airbag module comprising an airbag receiving means having at least two fastening brackets and circumferential welding ribs defining a connection region of the instrument panel, wherein the at least two fastening brackets are aligned with each other and opposite each other and each has a mutually facing opening. Through the mutually facing opening, the cores necessary for creating the openings are de-molded inward, whereby the circumferential welding ribs are made possible.

In addition, an embodiment of the invention provides a method for connecting an airbag module comprising an airbag receiving means with an instrument panel of a vehicle. The method comprises at least the steps:

Producing at least one part of the instrument panel by means of a casting method using a device according to an embodiment described above, wherein at least two fastening brackets, which are aligned with one another and opposite one another, are formed on the instrument panel, Removing respective casting cores from the respective fastening brackets to form respective openings in the fastening brackets, the removal from the fastening brackets being accomplished by moving the respective casting cores toward one another, Producing an airbag receiving means and an airbag carrier, Welding the airbag holder to the instrument panel, and Fastening the airbag carrier to the airbag receiving means and the fastening brackets by means of fasteners, whereby the airbag module is connected to the instrument panel.

Finally, a vehicle with an instrument panel according to any one of the above-described embodiments and a fastening apparatus according to any one of the embodiments described above is proposed, wherein an airbag module is fastened in the vehicle using a method of connecting the airbag module according to an embodiment described above.

Further advantages and embodiments of the invention can be found in the description and the attached drawings. The invention is depicted schematically by means of embodi-

DETAILED DESCRIPTION OF THE FIGURES

Figure 1:
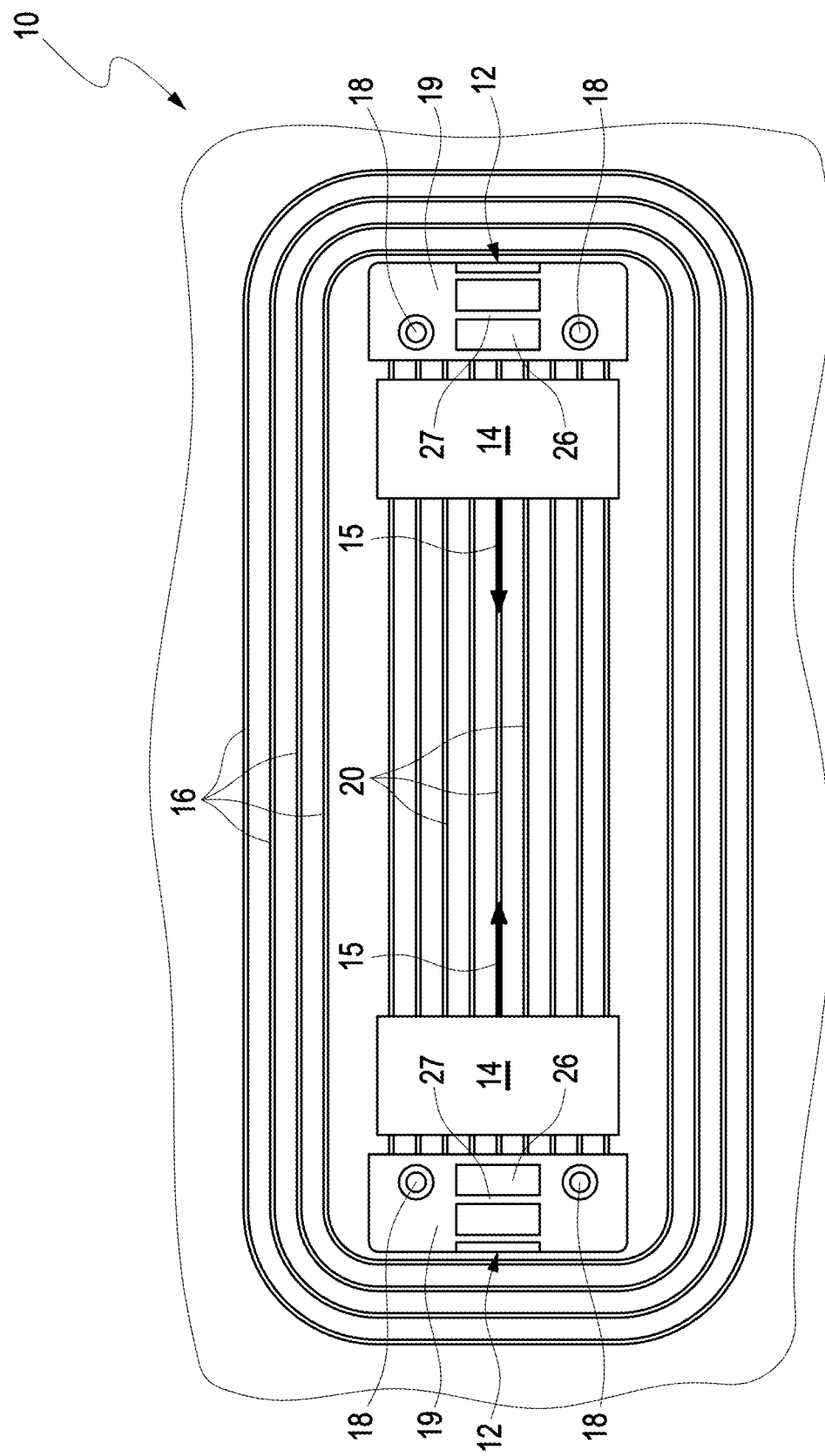
FIG. 1 shows a plan view of an embodiment of an instrument panel according to an embodiment of the invention.

The instrument panel 10 according to an embodiment of the invention shown in sections in FIG. 1 is produced in an injection molding process and has two fastening brackets 12. The two fastening brackets 12 are formed on the instrument panel 10, by cores or slides 14 being removed according to the manufacturing method. However, the slides 14 are arranged so that the respective de-molding directions 15 of the slide 14 are directed towards each other. The slides 14 are thus removed by being moved towards each other.

The portion of the instrument panel 10 also has four weld ribs 16. Through the fact that the slides 14 are removed towards each other to the inside, the welding ribs 16 can be formed and arranged continuously around the fastening brackets 12 and circumferentially. The connecting effect of a welded connection, as described below, is thereby considerably increased. The welding ribs 16 define the connecting region of the fastening device.

In addition, the fastening brackets 12 each have two mounting bores 18. The fastening bores 18 are formed in a flange 19 of the fastening bracket 12. In addition, the instrument panel 10 has further welding ribs 20 in a region between the fastening brackets 12.

Figure 2:
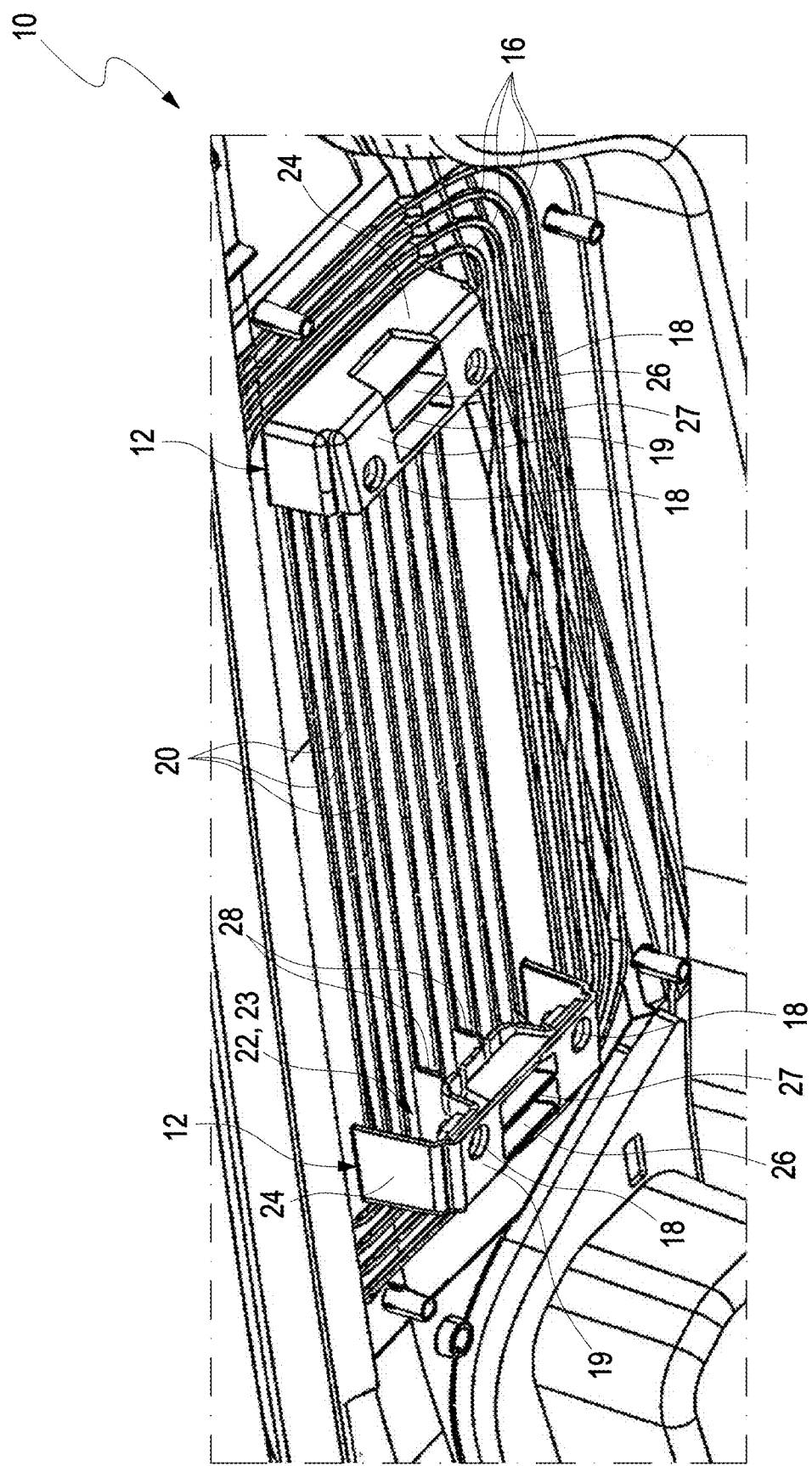
FIG. 2 shows a perspective view of an embodiment of an instrument panel according to an embodiment of the invention.

FIG. 2 shows an embodiment of the instrument panel 10 in a perspective view, in which a respective opening 22 in the attachment bracket 12 can be seen. The fastening bracket 12 is formed and bounded by a projection 24 protruding from the instrument panel 10 and the flange 19 formed on the projection 24. The projection 24 and the flange 19 thus define a compartment 23. The respective compartment 23 or opening 22 of the respective fastening brackets 12 are aligned with each other or point to each other.

Recesses 26 are formed in the flange 19, wherein a rib 27 remains in each recess. Each of the mounting bores 18 are arranged in the flange 19. Furthermore, two stiffening ribs 28 each are arranged in the compartment 23 of the fastening brackets 12.

Further welding ribs 16 are formed around the fastening brackets 12, which run around the fastening brackets 12 continuously. In the area between the fastening brackets 12, more welding ribs 20 are also formed.

Figure 3:
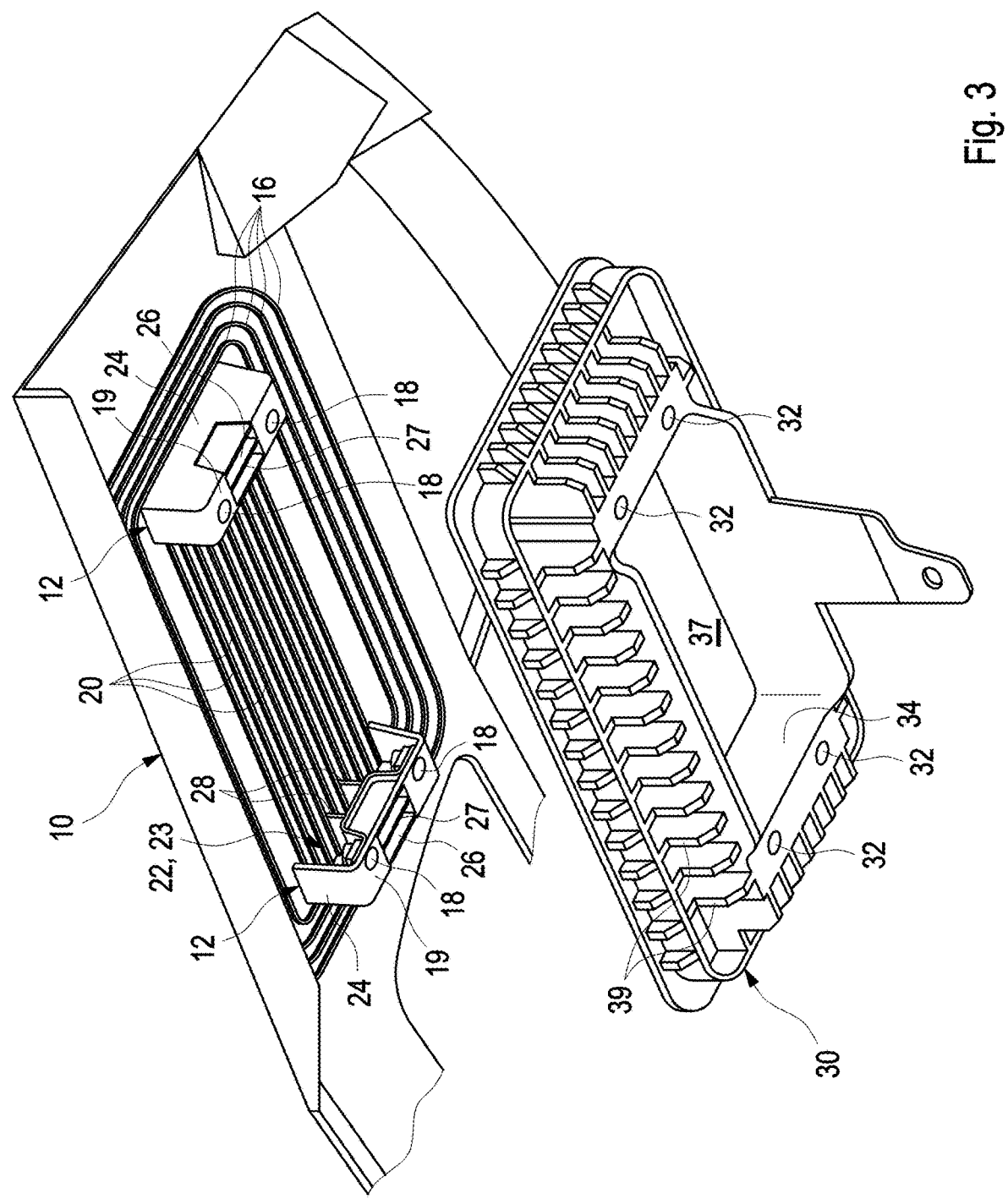
FIG. 3 shows a perspective view of an embodiment of a fastening device according to an embodiment of the invention.

FIG. 3 shows an instrument panel 10 according to an embodiment of the invention together with an airbag receiving means 30. The fastening brackets 12 of the instrument panel 10 again have the opening 22 and compartment 23, which has two stiffening ribs 28. Furthermore, the fastening brackets 12 have mounting bores 18. Welding ribs 16 are arranged circumferentially and continuously around the fastening brackets 12. Welding ribs 20 are also arranged in the area between the fastening brackets 12.

The airbag receiving means 30 has corresponding connection bores 32. The connection bores 32 correspond in size and alignment with the fastening bores 18 of the fastening brackets 12 of the instrument support 10. The airbag receiving means 30 further has a wall 34 which covers the opening 22 or compartment 23 of the fastening brackets 12. The wall 34 is adapted to provide guidance to the airbag or air sac of the airbag and to receive the air sac. The wall 34 defines an interior region 37 of the airbag receiving means 30. The wall 34 is supported by stiffening ribs 39.

Figure 4:
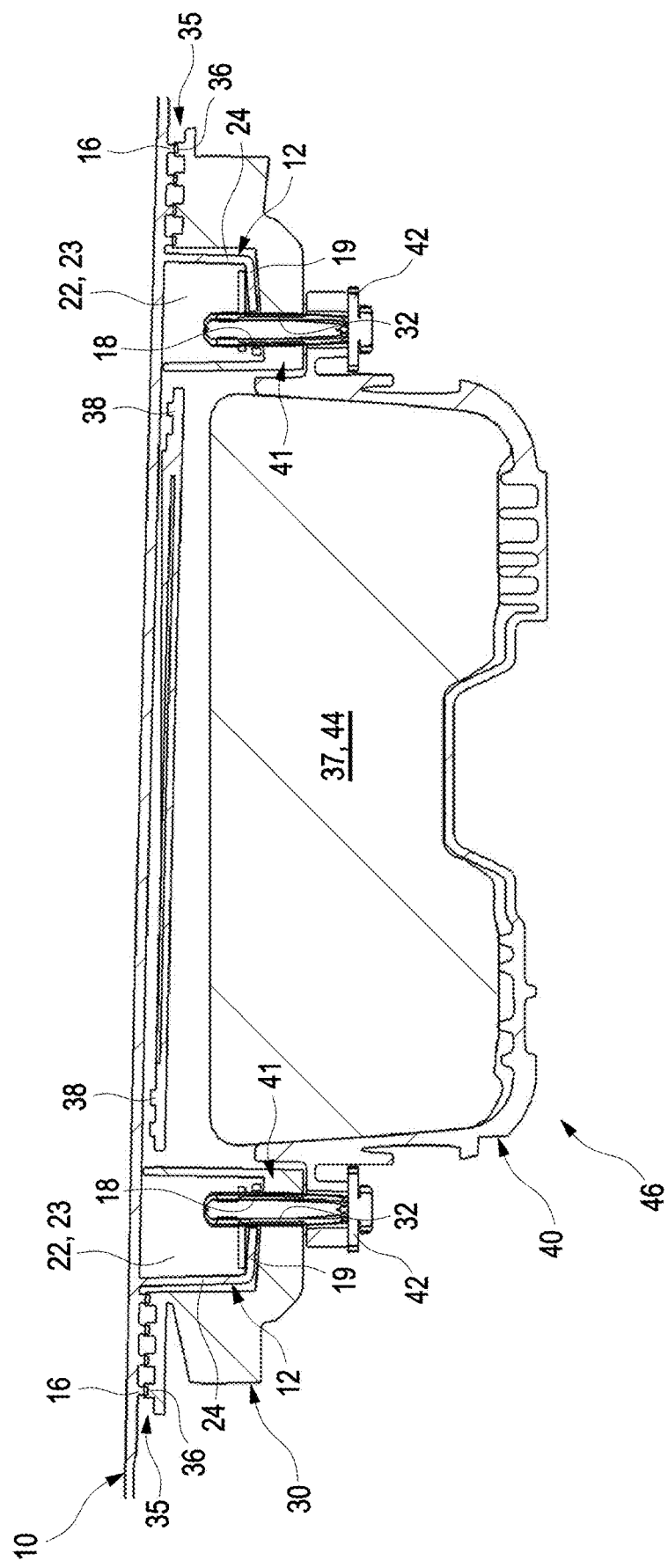
FIG. 4 shows a sectional view of an embodiment of a fastening device according to an embodiment of the invention.

The airbag receiving means 30 is welded to the instrument panel 10 via a welded connection 35, as shown in FIG. 4. For this purpose, the airbag receiving means 30 has respective welding ribs 36, which correspond to the welding ribs 16 of the instrument panel 10. In addition, the airbag receiving means 30 has further welding ribs 38, which correspond to the welding ribs 20 of the instrument panel 10, which are not visible in FIG. 4. The welding ribs 16, 36 and 20, 38 each form their own welding zones. Due to the fact that the welding ribs 16 and 36 are circumferential, a particularly homogeneous welding zone is formed in the edge region of the fastening device. In particular, friction welding, ultrasonic welding and infrared welding are considered as welding methods. As a result, high forces and torques can be absorbed very well.

An airbag carrier 40 is connected to the airbag receiving means 30 and the instrument panel 10 via a mechanical connection 41. For this purpose, a fastening means 42 is inserted into the corresponding bores, namely in the mounting bores 18 and in the connecting bores 32. The fastener 42 may be a screw, a rivet or the like. The fastener 42 protrudes into the compartment 23 of the fastening bracket 12 and is anchored therein. The airbag carrier 40 carries the actual airbag 44. The airbag receiving means 30 and the airbag carrier 40 together with the airbag 44 form an airbag module 46. The airbag module 46 is thus connected to the instrument panel 10 via the welded connection 35 and the mechanical connection 41.

The invention claimed is:

1. A fastening device for fastening an airbag module to an airbag receiver on an instrument panel of a vehicle, the fastening device comprising:
   at least one mechanical connection between the airbag module and the instrument panel; and
   at least one welded connection between the airbag module and the instrument panel,
   wherein the at least one mechanical connection includes a fastening bracket comprising a projection disposed on the instrument panel and a flange protruding from the projection, the projection and the flange collectively define a compartment,
   wherein the at least one welded connection includes corresponding welding connection regions located on the instrument panel and the airbag receiver, and
   wherein the projection and the flange of the fastening bracket are integrally formed as a single unitary body.

2. The fastening device according to claim 1, wherein the at least one mechanical connection includes at least two fastening brackets formed on the instrument panel, each fastening bracket having at least one mounting bore,
   wherein the airbag receiver is arranged between the instrument panel and an airbag carrier, the airbag receiver having connecting bores corresponding to the at least one mounting bore of the at least two fastening brackets, and wherein the fastening device further comprises fasteners, and the at least one mounting bore and the connecting bores are adapted to receive a respective fastener such that the fasteners are adapted to attach the airbag carrier on the at least two fastening brackets and the airbag receiver and to connect the airbag carrier to the instrument panel.

3. The fastening device according to claim 2, wherein the at least two fastening brackets are arranged opposite one another at an edge region of the fastening device and the compartment of each fastening bracket includes an opening, and the opening of each compartment is aligned with one another.

4. The fastening device according to claim 2, wherein the welding connection region on the instrument panel comprises a plurality of welding ribs, and the welding connection region on the airbag receiver comprises a plurality of welding ribs configured to be welded to the welding ribs on the instrument panel.

5. The fastening device according to claim 4, wherein the plurality of welding ribs on the instrument panel and the airbag receiver are arranged continuously circumferentially around the at least two fastening brackets.

6. The fastening device according to claim 5, wherein the plurality of welding ribs comprises four welding ribs formed on the instrument panel and the airbag receiver, and the four welding ribs on the instrument panel and the airbag receiver run concentrically around the at least two fastening brackets.

7. The fastening device according to claim 4, wherein the plurality of welding ribs on the instrument and the airbag receiver are disposed between the at least two fastening brackets.

8. The fastening device according to claim 1, wherein the at least two fastening brackets each have at least one stiffening rib.

9. A device for preparing at least a portion of an instrument panel comprising:
a mold comprising at least two cores for forming at least two fastening brackets, and
means for forming continuous welding ribs,
wherein the at least two cores each have an opening side, so that the at least two cores are configured to be removed from the casting mold after a casting process by moving the at least two cores towards one another,
wherein the at least two cores are configured to define a compartment in each of the at least two fastening brackets,
wherein each compartment includes an opening, and the openings of the compartments face each other.

10. The device according to claim 9, wherein the at least two cores each have at least one recess adapted to form at least one stiffening rib in the compartment of the fastening bracket.

11. An instrument panel of a vehicle for receiving an airbag module with an airbag receiver, the instrument panel comprising:
at least two fastening brackets disposed on the instrument panel; and
a plurality of circumferential welding ribs defining a connection region of the instrument panel,
wherein the at least two fastening brackets are aligned with each other and disposed opposite to each other such that the at least two fastening brackets each include a mutually facing opening.

12. A method for connecting an airbag module comprising an airbag receiver to an instrument panel of a vehicle, the method comprising:
producing at least a part of the instrument panel by using a device of claim 9, wherein at least two fastening brackets are formed on the instrument panel, and the at least two fastening brackets are aligned with each other and disposed opposite to one another;
removing casting cores from each fastening bracket to form openings in each fastening bracket, wherein the at least two fastening brackets are removed by moving the casting cores toward one another,
providing an airbag receiver and an airbag carrier of an airbag module;
welding the airbag receiver to the instrument panel; and
securing the airbag carrier on the airbag receiver and the at least two fastening brackets by using a fastener such that the airbag module is connected to the instrument panel.

13. The fastening device according to claim 1, wherein the projection and the flange of the fastening bracket are integrally formed by injection molding.

14. The fastening device according to claim 13, wherein the projection of the fastening bracket is integrally connected to the instrument panel by injection molding.

* * * * *